(12) United States Patent
Li et al.

(10) Patent No.: US 12,026,068 B2
(45) Date of Patent: Jul. 2, 2024

(54) METHOD FOR DATA READING AND WRITING PROCESSING, DATA CENTER, DISASTER RECOVERY SYSTEM AND STORAGE MEDIUM

(71) Applicant: CHINA UNIONPAY CO., LTD., Shanghai (CN)

(72) Inventors: Daili Li, Shanghai (CN); Xudong Tang, Shanghai (CN); Ye Lian, Shanghai (CN); Wei Lv, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 55 days.

(21) Appl. No.: 17/765,891

(22) PCT Filed: Feb. 8, 2021

(86) PCT No.: PCT/CN2021/075963
§ 371 (c)(1),
(2) Date: Apr. 1, 2022

(87) PCT Pub. No.: WO2022/041661
PCT Pub. Date: Mar. 3, 2022

(65) Prior Publication Data
US 2022/0342777 A1 Oct. 27, 2022

(30) Foreign Application Priority Data
Aug. 24, 2020 (CN) .......................... 202010859638.6

(51) Int. Cl.
G06F 16/20 (2019.01)
G06F 11/14 (2006.01)
G06F 16/27 (2019.01)

(52) U.S. Cl.
CPC .......... *G06F 11/1469* (2013.01); *G06F 16/27* (2019.01); *G06F 2201/84* (2013.01)

(58) Field of Classification Search
None
See application file for complete search history.

(56) References Cited

U.S. PATENT DOCUMENTS 10,698,882 B2  6/2020  Parikh et al.
2003/0078965 A1*  4/2003  Cocotis ................. G06F 3/1288
                                         709/203

(Continued)

FOREIGN PATENT DOCUMENTS

CN    101656624 A    2/2010
CN    106126374 A    11/2016

(Continued)

OTHER PUBLICATIONS

International Search Report issued on May 20, 2021 for International PCT application No. PCT/CN2021/075963.

(Continued)

*Primary Examiner* — Jau Shya Meng
(74) *Attorney, Agent, or Firm* — K&L Gates LLP

(57) ABSTRACT

The application provides a method for data reading and writing processing, data center, disaster recovery system and storage medium. The method includes receiving, by a first data center, a data reading request including a first user identification; determining, in response to the data reading request, whether a writing user identification set stored in the first data center includes the first user identification, the writing user identification set including user identifications corresponding to data writing requests; and under a condition that the writing user identification set includes the first user identification, forwarding the data reading request to a second data center, to read, in the second data center, data to be read as indicated by the data reading request, the second (Continued)

data center being configured to receive and process a data writing request sent by a user terminal or forwarded by the first data center.

15 Claims, 11 Drawing Sheets

(56) References Cited

U.S. PATENT DOCUMENTS

| | | | | |
|---|---|---|---|---|
| 2004/0064480 A1* | 4/2004 | Bartlett | ............... | G06F 9/44505 |
| 2004/0078374 A1* | 4/2004 | Hamilton | ............ | G06F 16/2452 |
| 2011/0138416 A1* | 6/2011 | Kang | .................... | G06F 3/0482 |
| | | | | 725/39 |
| 2014/0136840 A1* | 5/2014 | Spalka | .................... | G06F 16/27 |
| | | | | 713/165 |
| 2016/0036794 A1* | 2/2016 | Adhya | ................. | H04W 12/50 |
| | | | | 726/4 |
| 2016/0371358 A1* | 12/2016 | Lee | ..................... | G06F 16/2343 |
| 2020/0265016 A1 | 8/2020 | Kumarasamy et al. | | |
| 2020/0394648 A1* | 12/2020 | Blackshear | ......... | G06Q 20/3823 |
| 2021/0158367 A1* | 5/2021 | Bhosale | .............. | G06F 16/2455 |

FOREIGN PATENT DOCUMENTS

| | | |
|---|---|---|
| CN | 106815218 A | 6/2017 |
| CN | 106874281 A | 6/2017 |
| CN | 107025289 A | 8/2017 |
| CN | 110489092 A | 11/2019 |
| CN | 110597673 A | 12/2019 |
| CN | 110865985 A | 3/2020 |
| CN | 111460035 A | 7/2020 |
| CN | 112084200 A | 12/2020 |
| WO | WO2018107772 A1 | 6/2018 |

OTHER PUBLICATIONS

The First Office Action issued on Mar. 3, 2022 for Taiwanese Patent Application No. 110118597.

* cited by examiner

METHOD FOR DATA READING AND WRITING PROCESSING, DATA CENTER, DISASTER RECOVERY SYSTEM AND STORAGE MEDIUM

CROSS-REFERENCE TO RELATED APPLICATIONS

The present application is a National Stage of International Application No. PCT/CN2021/075963, filed on Feb. 8, 2021, which claims the priority to Chinese patent application No. 202010859638.6, filed on Aug. 24, 2020, both of which are hereby incorporated by reference in their entireties for all purposes.

TECHNICAL FIELD

The present application belongs to the field of data processing, and relates particularly to a method for data reading and writing processing, data center, disaster recovery system and storage medium.

BACKGROUND

With the wide application of communication technologies in various fields, in order to ensure the convenience of reading and writing data, data centers may be established to store data. Users with data center permissions can read data from and write data to the data centers. Data centers oriented to user terminal applications are usually characterized by more reading and less writing, i.e., a large amount of data reading requests and a small amount of data writing requests. For example, about 95% of requests in some user information systems are data reading requests, and about 5% of the requests are data writing requests.

Since there are many users corresponding to a data center, a data reading request may follow immediately after a data writing request that is successfully serviced. In a system with multiple data centers, there may be a case that data successfully written in one data center may not be read from another data center. As a result, reading/writing reliability of a disaster recovery system with multiple data centers is reduced.

SUMMARY

The present application provides a method for data reading and writing processing, data center, disaster recovery system and storage medium.

In a first aspect, an embodiment of the present application provides a method for data reading and writing processing, applicable to a first data center. The method includes: receiving a data reading request including a first user identification; determining, in response to the data reading request, whether a writing user identification set stored in the first data center includes the first user identification, the writing user identification set including user identifications corresponding to data writing requests; and under a condition that the writing user identification set includes the first user identification, forwarding the data reading request to a second data center, to read, in the second data center, data to be read as indicated by the data reading request, the second data center being configured to receive and process a data writing request sent by a user terminal or forwarded by the first data center.

In a second aspect, an embodiment of the present application provides a method for data reading and writing processing, applicable to a second data center. The method includes: receiving a data reading request forwarded by a first data center, a first user identification in the data reading request belonging to a writing user identification set stored in the first data center, and the writing user identification set including user identifications corresponding to data writing requests; and reading, in the second data center, data to be read as indicated by the data reading request, in response to the data reading request, the second data center being configured to receive and process a data writing request sent by a user terminal or forwarded by the first data center.

In a third aspect, an embodiment of the present application provides a method for data reading and writing processing, applicable to a first data center. The method includes: receiving a data reading request; and reading data to be read as indicated by the data reading request, under a condition that a data synchronization completion message sent by a second data center is received, the second data center being configured to receive and process a data writing request sent by a user terminal or forwarded by the first data center, and the data synchronization completion message being used to indicate that data synchronization between the second data center and the first data center is completed.

In a fourth aspect, an embodiment of the present application provides a method for data reading and writing processing, applicable to a second data center. The method includes: receiving a data reading request sent by a user terminal or forwarded by a first data center; writing, in response to the data writing request, data to be written as indicated by the data writing request, and synchronizing data in the second data center to the first data center; and transmitting a data synchronization completion message to the first data center, under a condition that data synchronization between the second data center and the first data center is completed In a fifth aspect, an embodiment of the present application provides a first data center. The first data center includes a receiving module, configured to receive a data reading request including a first user identification; a processing module, configured to determine, in response to the data reading request, whether a writing user identification set stored in the first data center includes the first user identification, the writing user identification set including user identifications corresponding to data writing requests; and a transmitting module, configured to forward, under a condition that the writing user identification set includes the first user identification, the data reading request to a second data center, to read, in the second data center, data to be read as indicated by the data reading request, the second data center being configured to receive and process a data writing request sent by a user terminal or forwarded by the first data center.

In a sixth aspect, an embodiment of the present application provides a second data center. The second data center includes a receiving module, configured to receive a data reading request forwarded by a first data center, a first user identification in the data reading request belonging to a writing user identification set stored in the first data center, and the writing user identification set including user identifications corresponding to data writing requests; and a reading module, configured to read data to be read as indicated by the data reading request, in response to the data reading request; the receiving module further configured to receive and process a data writing request sent by a user terminal or forwarded by the first data center.

In a seventh aspect, an embodiment of the present application provides a first data center. The first data center includes a receiving module, configured to receive a data reading request; and a reading module, configured to read data to be read as indicated by the data reading request, under a condition that a data synchronization completion message sent by a second data center is received, the second data center being configured to receive and process a data writing request sent by a user terminal or forwarded by the first data center, and the data synchronization completion message being used to indicate that data synchronization between the second data center and the first data center is completed.

In an eighth aspect, an embodiment of the present application provides a second data center. The second data center includes a receiving module, configured to receive a data writing request sent by a user terminal or forwarded by a first data center; a writing module, configured to write, in response to the data writing request, data to be written as indicated by the data writing request; a synchronizing module, configured to synchronize data in the second data center to the first data center; and a transmitting module, configured to transmit a data synchronization completion message to the first data center, under a condition that data synchronization between the second data center and the first data center is completed.

In a ninth aspect, an embodiment of the present application provides a disaster recovery system. The disaster recovery system includes the first data center of the fifth aspect and the second data center of the sixth aspect, or the first data center of the seventh aspect and the second data center of the eighth aspect.

In a tenth aspect, an embodiment of the present application provides a data center. The data center includes a processor and a memory storing computer program instructions. When the processor executes the computer program instructions, the method for data reading and writing processing of any one of the first aspect, the second aspect, the third aspect and the fourth aspect is implemented.

In an eleventh aspect, an embodiment of the present application provides a computer storage medium having computer program instructions stored thereon. The computer program instructions, when executed by a processor, cause the method for data reading and writing processing of any one of the first aspect, the second aspect, the third aspect and the fourth aspect to be implemented.

BRIEF DESCRIPTION OF THE DRAWINGS

In order to illustrate the technical solutions of embodiments of the present application more clearly, the drawings necessary for explaining the embodiments of the present application are introduced briefly below. For those of ordinary skills in the art, other drawings can be derived from these drawings without any creative work.

DETAILED DESCRIPTION

Features and exemplary embodiments of various aspects of the present application will be described in details below. In order to make the objects, technical solutions and advantages of the present application clearer, the present application is further described in details below with reference to the accompany drawings and specific embodiments. It should be understood that the specific embodiments described herein are only for illustration of the present application, and are not for limiting the present application. For those skilled in the art, the present application can be implemented without some of those specific details. The below description of embodiments is only for providing better understanding of the present application by showing examples of the present application.

With the development of communication technologies, a data center may be established to store data, in order to ensure the convenience of reading and writing data. A user may read data from the data center and write data to the data center. In order to avoid a loss or unavailability of data due to failure or damage of one data center, a plurality of data centers can be established, which can synchronize and backup data with/for each other to realize disaster recovery backup and improve the reliability of the data centers.

However, data synchronization among the plurality of data centers is usually asynchronous data synchronization performed by a data transfer component, and thus the data synchronization takes a certain amount of time. As a result, there may be a situation that data has been written to one of the data centers, but has not been synchronized to other data centers yet, leading to a situation that the data that has been written to one data center cannot be read in another data center, that is, the data that has been written to the data centers fails to be read.

Embodiments of the present application provide methods for data reading and writing processing, data centers, disaster recovery systems and storage media, which can avoid failure to read data that has been written in the data centers, so as to improve the reading and writing reliability of the disaster recovery system with multiple data centers.

Figure 1:
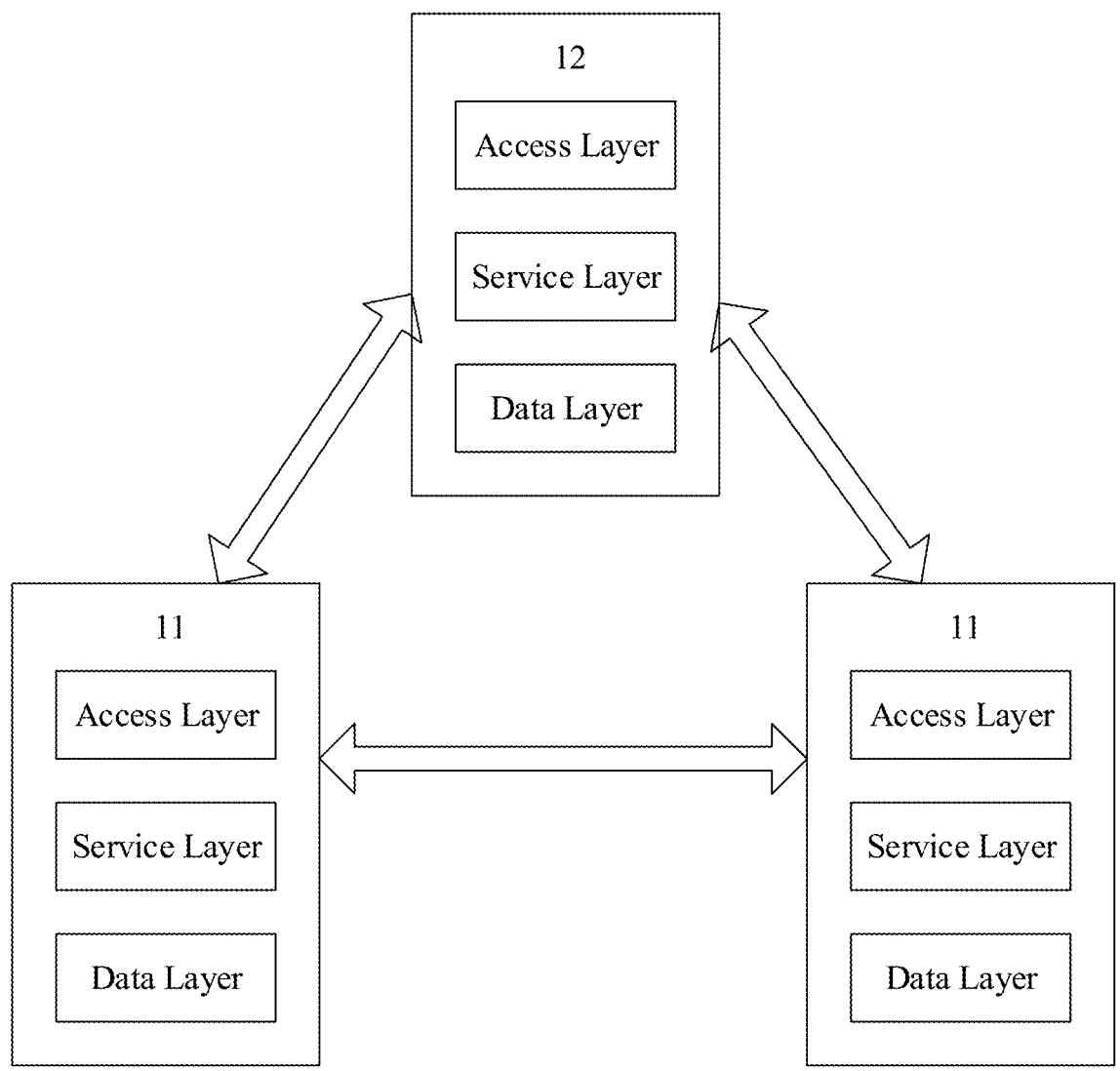
FIG. 1 is a schematic architecture diagram of an example of a disaster recovery system provided by an embodiment of the present application.

A disaster recovery system may include more than two data centers. The more than two data centers may be divided into two categories: one category is a reading data center, labeled as a first data center; the other category is a reading and writing data center, labeled as a second data center. The number of the first data center(s) and the number of the second data center(s) in the disaster recovery system are not limited herein. FIG. 1 is a schematic architecture diagram of an example of a disaster recovery system provided by an embodiment of the present application. As shown in FIG. 1, the disaster recovery system includes two first data centers 11 and one second data center 12.

Each data center may include an access layer, a service layer and a data layer according to a functional architecture design. The access layer is configured to be accessed by access equipment, such as a user terminal, so as to communicate with the access equipment, such as the user terminal. The service layer is configured to provide services. The data layer is configured to store and access data. The above-mentioned access layer, service layer and data layer may be implemented by various units, modules, devices and apparatus etc., which are not limited herein.

A first data center 11 may receive a data writing request, but forward the data writing request to the second data center 12 instead of perform a data writing operation, and the second data center 12 may perform the data writing operation. A first data center 11 may receive a data reading request, and perform a data reading operation. The second data center 12 may receive a data writing request and a data reading request, and perform a data writing operation and a data reading operation. Data synchronization is still normally performed between the first data centers 11 and the second data center 12.

Figure 2:
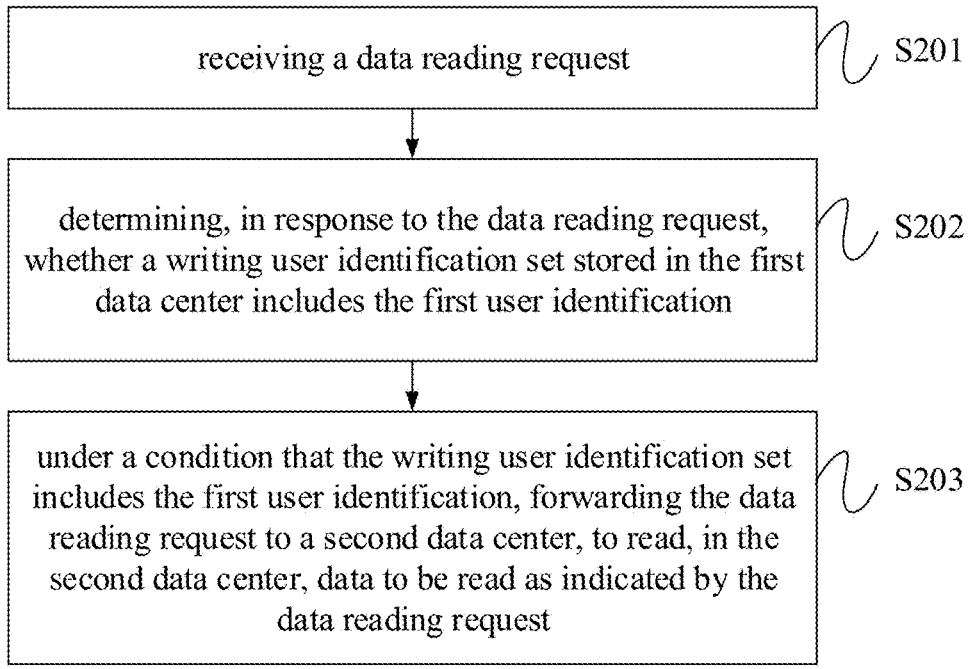
FIG. 2 is a flowchart of an embodiment of a method for data reading and writing processing applicable to a first data center provided by a first aspect of the present application.

A method for data reading and writing processing applicable to a first data center provided by an embodiment of the present application is illustrated below. The method for data reading and writing processing may be performed by the first data center. FIG. 2 is a flowchart of an embodiment of the method for data reading and writing processing applicable to the first data center provided by a first aspect of the present application. As shown in FIG. 2, the method for data reading and writing processing includes steps S201-S203.

In step S201, a data reading request is received.

The data reading request may be used to indicate to read data. The data reading request may include first user identification. Particularly, the data reading request may be used to indicate to read data corresponding to a user identified by the first user identification.

The first user identification is the user identification in the data reading request. The user identification is unique. Different user identifications identify different users. Different data reading requests may include different user identifications, which is not limited herein. In some examples, the first user identification may include a user name, a user ID, a mobile phone number bound to the user, etc., which is not limited herein.

In step S202, it is determined, in response to the data reading request, whether a writing user identification set stored in the first data center includes the first user identification.

The writing user identification set includes user identification(s) corresponding to data writing request(s), and may be stored in a cache of the first data center. In some examples, the writing user identification set may include user identification(s) corresponding to data writing request(s) within a preset time period from the present moment. The preset time period may be set according to a work scene and a work requirement, which is not limited herein. For example, the preset time period may be longer than or equal to a time period required for data synchronization.

The writing user identification set may include user identification corresponding to a data writing request received by the first data center, user identification corresponding to a data writing request received by another first data center, and user identification corresponding to a data writing request received by the second data center. User identification in the writing user identification set correspond to a user who has initiated a data writing request. There may be a possibility that data corresponding to the user has not been successfully synchronized in the first data center and the second data center.

When the first data center receives a data writing request, it obtains user identification corresponding to the data writing request, and writes the user identification corresponding to the data writing request to the writing user identification set. The first data center may further send the user identification corresponding to the data writing request to the other first data center and the second data center, so that the other first data center and the second data center may add the user identification corresponding to the data writing request to a writing user identification set in the other first data center and a writing user identification set in the second data center.

In some examples, a first data center may receive user identification sent by the other first data center or the second data center, and add the user identification sent by the other first data center or the second data center to a writing user identification set in the first data center.

For example, when the other first data center receives a data writing request, it obtains user identification corresponding to the data writing request, and sends the user identification to the first data center. The first data center may add the user identification corresponding to the data writing request obtained by other first data center to the writing user identification set in the first data center.

For another example, when the second data center receives a data writing request, it obtains user identification corresponding to the data writing request, and sends the user identification to the first data center. The first data center may add the user identification corresponding to the data writing request obtained by the second data center to the writing user identification set in the first data center.

In step S203, under a condition that the writing user identification set includes the first user identification, the data reading request is forwarded to a second data center, to read, in the second data center, data to be read as indicated by the data reading request.

If the writing user identification set includes the first user identification, it is indicated that the user corresponding to the first user identification has initiated a data writing request previously, and there may be a possibility that data corresponding to the user has not been successfully synchronized in the first data center and the second data center.

In some examples, the writing user identification set may include user identification(s) corresponding to data writing request(s) within a preset time period from the present moment. Correspondingly, if the writing user identification set includes the first user identification, it is indicated that the user corresponding to the first user identification has initiated a data writing request within the preset time period from the present moment, and there may be a possibility that the data corresponding to the user has not been successfully synchronized in the first data center and the second data center.

In order to obtain accurate data of the user, under the condition that the writing user identification set includes the first user identification, the data to be read as indicated by the data reading request may be read in the second data center. The second data center is configured to receive and process a data writing request sent by a user terminal or forwarded by the first data center. The process of the data writing request by the second data center refers specifically to writing the data to be written as indicated by the data writing request. That is to say, in the disaster recovery system, all data to be written as indicated by data writing request(s) is written to the second data center firstly. Since the number of data writing requests is much smaller than the number of data reading requests, the time taken by the first data center to forward the data writing request to the second data center is negligible.

Particularly, under the condition that the writing user identification set includes the first user identification, the data reading request may be forwarded to the second data center. The second data center may read the data to be read as indicated by the data reading request, in response to the data reading request. The second data center may feed the read data back to the first data center, and the first data center then may send the read data to a user terminal that initiated the data reading request.

The first data center may receive the data reading request via its access layer, and determine whether the writing user identification set stored in the first data center includes the first user identification, and under the condition that the writing user identification set includes the first user identification, forward the data reading request to the service layer of the second data center. The second data center may read the data to be read as indicated by the data reading request via its data layer.

In the embodiment of the present application, a route of a data reading request with first user identification belonging to the writing user identification set and a route of a data reading request with first user identification not belonging to the writing user identification set may be set, so that the data reading request with first user identification belonging to the writing user identification set may be forwarded to the second data center.

In the embodiment of the present application, the first data center has the writing user identification set stored therein, which includes user identification(s) corresponding to data writing request(s). When the writing user identification set includes the first user identification in the data reading request, it is indicated that the data to be read as indicated by the data reading request may be data that has been written as indicated by a previous data writing request. In that case, the first data center forwards the data reading request to the second data center, so that the data can be read in the second data center. The second data center is configured to receive and process a data writing request sent by a user terminal or forwarded by the first data center. That is to say, all data to be written as indicated by data writing request(s) is written to the second data center firstly. Therefore, the latest data of a user corresponding to the first user identification can be read in the second data center, which avoids a situation that data that has been written successfully cannot be read from the data centers, and improves the reading and writing reliability of the disaster recovery system with multiple data centers.

Moreover, only the data reading request corresponding to user identification in the writing user identification set will be forwarded to the second data center, so as to read data across the data centers. The amount of data read across the data centers is very small and will not affect the network bandwidth, etc. Therefore, the operational performance of the disaster recovery system with multiple data centers can be taken into account, on the basis that the reading and writing reliability of the disaster recovery system with multiple data centers is improved. Since the amount of data read across the data centers is small, there will not be much pressure on the data layer of the second data center. The performance requirement of the disaster recovery system with multiple data centers can still be satisfied in the case of high business concurrency.

Especially in the case that the writing user identification set may include user identification(s) corresponding to data writing request(s) within a preset time period from the present moment, the number of data writing request(s) within a preset time period from the present moment may be less, and thus there will be less times needed to read data across data centers. Therefore, the operational performance of the disaster recovery system with multiple data centers can be further taken into account, on the basis that the reading and writing reliability of the disaster recovery system with multiple data centers is improved.

Figure 3:
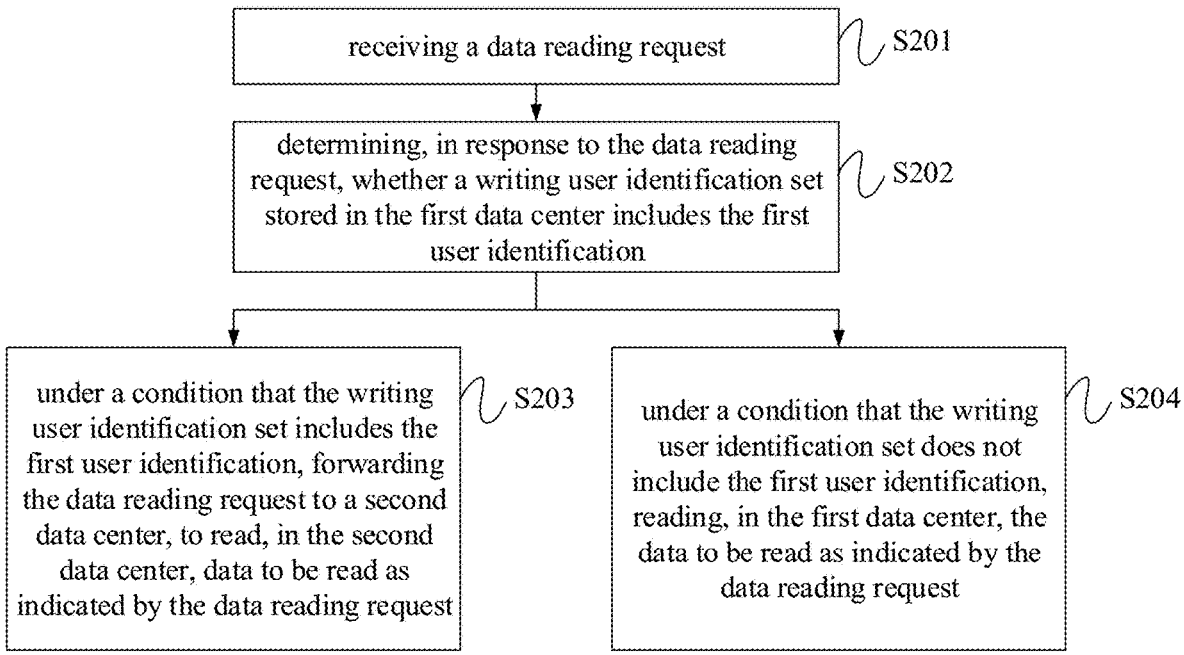
FIG. 3 is a flowchart of another embodiment of the method for data reading and writing processing applicable to the first data center provided by the first aspect of the present application.

FIG. 3 is a flowchart of another embodiment of the method for data reading and writing processing applicable to the first data center provided by the first aspect of the present application. FIG. 3 differs from FIG. 2 in that the method for data reading and writing processing shown in FIG. 3 may further include step S204.

In step S204, under a condition that the writing user identification set does not include the first user identification, the data to be read as indicated by the data reading request is read in the first data center.

If the writing user identification set does not include the first user identification, it is indicated that the user corresponding to the first user identification has not initiated a data writing request previously, and data corresponding to the user has been synchronized successfully in the first data center and the second data center. In some examples, the writing user identification set may include user identification (s) corresponding to data writing request(s) within a preset time period from the present moment. If the writing user identification set does not include the first user identification, it is indicated that the user corresponding to the first user identification has not initiated a data writing request within the preset time period from the present moment, and data corresponding to the user has been synchronized successfully in the first data center and the second data center.

For example, the writing user identification set stored in the first data center may include a user name c001, user name c002, user name c005, user name c006 and user name c009. The first data center receives a data reading request A1 with first user identification c001 included therein. The first user identification c001 belongs to the writing user identification set, and the first data center forwards the data reading request A1 to the second data center. The second data center read data to be read as indicated by the data reading request A1, in response to the data reading request A1.

For another example, the writing user identification set stored in the first data center may include a user name c001, user name c002, user name c005, user name c006 and user name c009. The first data center receives a data reading request A2 with first user identification c003 included therein. The first user identification c003 does not belong to the writing user identification set, and the first data center reads data to be read as indicated by the data reading request A2 from the first data center in response to the data reading request A2.

Figure 4:
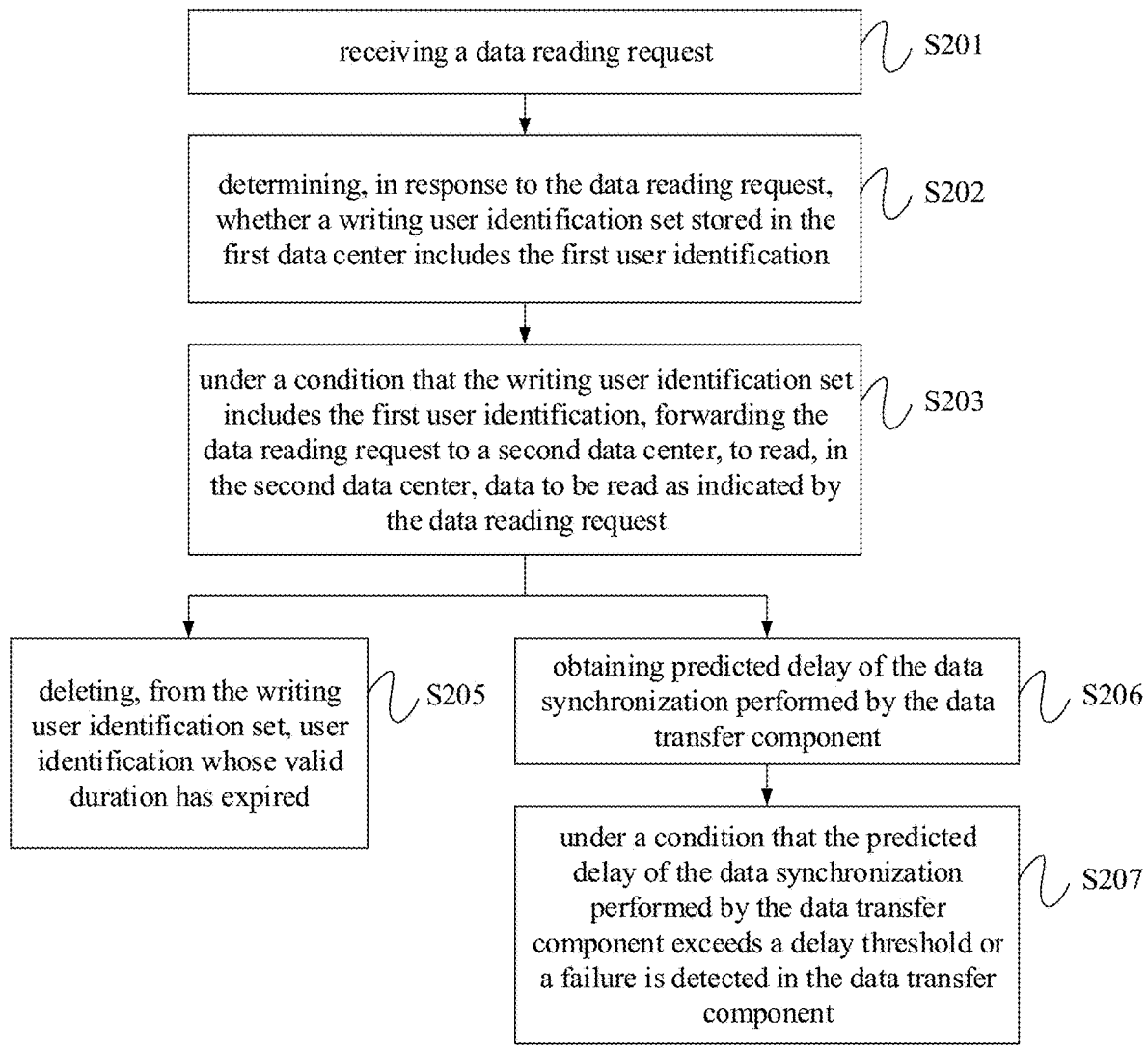
FIG. 4 is a flowchart of another embodiment of the method for data reading and writing processing applicable to the first data center provided by the first aspect of the present application.

Under the condition that the writing user identification set does not include the first user identification, there is no need to read data from the second data center, and the data to be read as indicated by the data reading request can be read directly from the first data center. Therefore, the number of times for reading data across data centers can be reduced and the operational performance of the disaster recovery system with multiple data centers can be improved FIG. 4 is a flowchart of another embodiment of the method for data reading and writing processing applicable to the first data center provided by the first aspect of the present application. FIG. 4 differs from FIG. 2 in that the method for data reading and writing processing shown in FIG. 4 may further include step S205, step S206 and step S207.

In step S205, a user identification whose valid duration has expired is deleted from the writing user identification set.

A valid duration may be set correspondingly for a user identification in the writing user identification set. The valid duration may be a duration during which the user identification exists in the writing user identification set. The valid duration may be set specifically according to a work scene or work requirement, which is not limited herein. For example, the valid duration may be set as 5 minutes.

When the valid duration of the user identification expires, it is indicated that data to be written as indicated by the data writing request corresponding to the user identification has been synchronized successfully in the first data center and the second data center, and can be read directly from the first data center by a data reading request. In order to reduce the number of times for reading data across the data centers, the user identification in the writing user identification set whose valid duration has expired can be deleted.

In some examples, a countdown with the valid duration may be started when user identification is added to the writing user identification set. When the countdown reaches 0, the user identification that has be written into the writing user identification set and whose countdown is 0 may be deleted.

In step S206, predicted delay of data synchronization performed by a data transfer component is obtained.

The data synchronization may be performed between the first data center and the second data center by the data transfer component. The predicted delay of data synchronization performed by the data transfer component is a predicted time period from the present moment to a moment when the data synchronization is completed.

In step S207, under a condition that the predicted delay of the data synchronization performed by the data transfer component exceeds a delay threshold or a failure is detected in the data transfer component, the valid duration of the user identification in the writing user identification set is extended, or the data reading request is forwarded to the second data center.

The delay threshold may be set specifically according to a work scene or work requirement, which is not limited herein. In some examples, the delay threshold can be adjusted dynamically. If the predicted delay of the data synchronization performed by the data transfer component exceeds the delay threshold, it may be indicated that the data transfer component fails to complete the data synchronization within a normal time period as specified. In order to prevent a situation that the data transfer component from fails to complete the data synchronization within the normal time period as specified and the user identification that has be written into the writing user identification set and whose valid duration has expired is deleted, resulting that the written data cannot be read in the first data center, the valid duration of the user identification in the writing user identification set can be extended, so as to guarantee that data that has not been synchronized to the first data center yet can be read in the second data center, and thus the reading and writing reliability of the disaster recovery system with multiple data centers can be guaranteed. For example, when the delay threshold is 4 minutes and the valid duration is 4 minutes, under a condition that the predicted delay of the data synchronization performed by the data transfer component exceeds 4 minutes, the valid duration of the user identification in the writing user identification set may be extended to 6 minutes. Alternatively, under the condition that the predicted delay of the data synchronization performed by the data transfer component exceeds the delay threshold, the data reading request may be forwarded to the second data center firstly, to guarantee the reading and writing reliability of the disaster recovery system with multiple data centers.

A failure in the data transfer component may be detected in real time. For example, it may be determined whether a failure occurs in the data transfer component using heartbeat detection or health detection. Under the condition that it is determined that the failure occurs in the data transfer component, the valid duration of the user identification in the writing user identification set can be extended, so as to guarantee that data that has not been synchronized to the first data center yet can be read in the second data center, and thus the reading and writing reliability of the disaster recovery system with multiple data centers can be guaranteed. Alternatively, under the condition that it is determined that the failure occurs in the data transfer component, the data reading request may be forwarded to the second data center during the failure of the data transfer component, to guarantee the reading and writing reliability of the disaster recovery system with multiple data centers.

Figure 5:
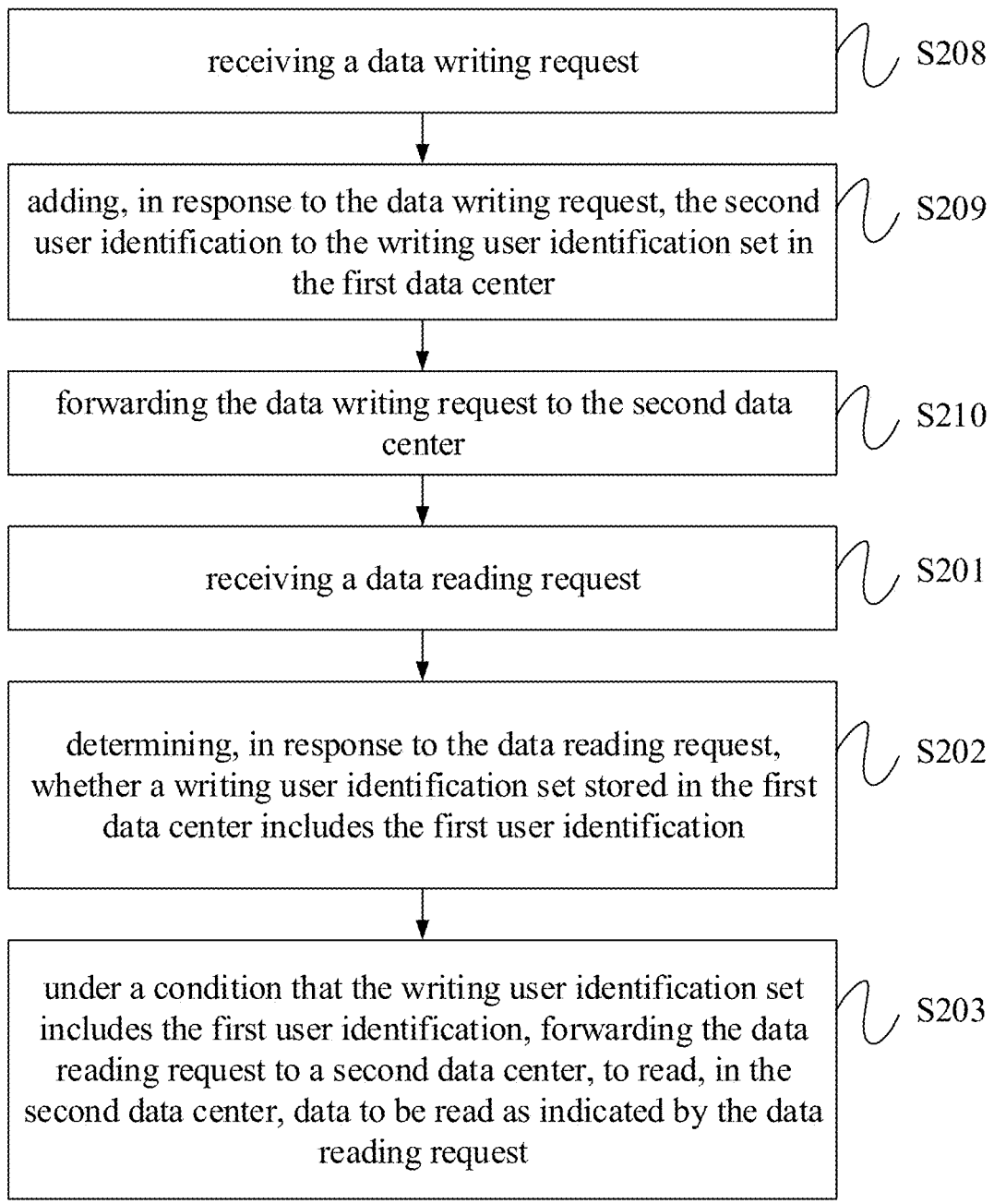
FIG. 5 is a flowchart of another embodiment of the method for data reading and writing processing applicable to the first data center provided by the first aspect of the present application.

FIG. 5 is a flowchart of another embodiment of the method for data reading and writing processing applicable to the first data center provided by the first aspect of the present application. FIG. 5 differs from FIG. 2 in that the method for data reading and writing processing shown in FIG. 5 may further include steps S208-S210.

In step S208, a data writing request is received.

The data writing request may be used to indicate to write data. Writing data here may include adding new data or modifying data, which is not limited herein. The data writing request may include second user identification. Particularly, the data writing request may be used to indicate to write data corresponding to a user identified by the second user identification.

The second user identification is user identification in the data writing request. Different data writing requests may include different user identifications, which is not limited herein. In some examples, the second user identification may include a user name, a user ID, a mobile phone number bound to the user, etc., which is not limited herein.

In step S209, the second user identification is added to the writing user identification set in the first data center, in response to the data writing request.

Under a condition that the second user identification is added to the writing user identification set, when the user identified by the second user identification initiates a data reading request, the data reading request initiated by the user identified by the second user identification may be forwarded to the second data center for processing, using the writing user identification set, so as to avoid a situation that the written data cannot be read in the data center, and improve the read and write reliability of the disaster recovery system with multiple data centers.

In step S210, the data writing request is forwarded to the second data center.

The first data center does not process the data writing request, but forwards the data writing request to the second data center for processing by the second data center, so as to centrally process data writing requests in the second data center, to guarantee the data integrity of the second data center.

Figure 6:
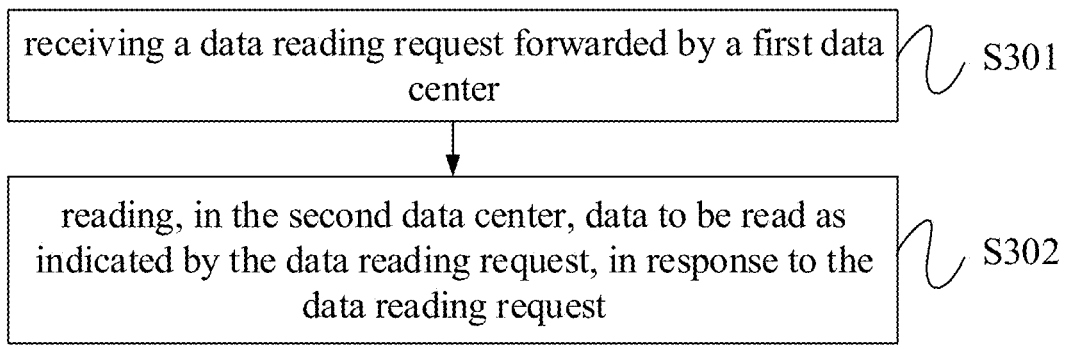
FIG. 6 is a flowchart of an embodiment of a method for data reading and writing processing applicable to a second data center provided by a second aspect of the present application.

A method for data reading and writing processing applicable to the second data center provided by an embodiment of the present application is illustrated below. The method for data reading and writing processing may be performed by the second data center. FIG. 6 is a flowchart of an embodiment of the method for data reading and writing processing applicable to the second data center provided by a second aspect of the present application. As shown in FIG. 6, the method for data reading and writing processing includes step S301 and step S203.

In step S301, a data reading request forwarded by a first data center is received.

The data reading request includes first user identification. The first user identification in the data reading request belongs to a writing user identification set stored in the first data center. The writing user identification set includes user identification(s) corresponding to data writing request(s). In some examples, the writing user identification set may include user identification(s) corresponding to data writing request(s) within a preset time period from the present moment. For specific contents of the writing user identification set, please refer to the relevant descriptions in the foregoing embodiments, which will not be repeated here.

In step S302, data to be read as indicated by the data reading request is read in the second data center, in response to the data reading request.

The second data center may be configured to receive and process a data writing request sent by a user terminal or forwarded by the first data center. That is to say, the first data center may forward the data writing request received from the user terminal to the second data center for processing, the second data center may receive and process the data writing request send directly from the user terminal. The processing on the data writing request by the second data center refers particularly to writing data to be written as indicated by the data writing request. That is to say, the second data center stores the latest and most complete data.

The second data center may read data to be read as indicated by the data reading request in response to the data reading request forwarded by the first data center. The second data center may feed the read data back to the first data center, and the first data center may feed the data back to the corresponding user terminal.

In some examples, the second data center may receive a data reading request sent by the user terminal, and in response to the data reading request sent by the user terminal, read data to be read as indicated by the data reading request. The second data center may feed the read data back to the corresponding user terminal.

In this embodiment of the present application, the second data center may receive the data reading request forwarded by the first data center. The first user identification of the data reading request belongs to the writing user identification set. The writing user identification set includes user identification(s) corresponding to data writing request(s). When the first user identification belongs to the writing user identification set, it is indicated that there is a possibility that the data to be read as indicated by the data reading request are data that has been written as indicated by a previous data writing request. In that case, the first data center forwards the data reading request to the second data center, so that the data can be read in the second data center. The second data center is configured to receive and process a data writing request sent by a user terminal or forwarded by the first data center. That is to say, all data to be written as indicated by data writing request(s) is written to the second data center firstly. Therefore, the latest data of a user corresponding to the first user identification can be read in the second data center, which avoids a situation that data that has been written successfully cannot be read from the data centers, and improves the reading and writing reliability of a disaster recovery system with multiple data centers.

Moreover, only the data reading request corresponding to user identification in the writing user identification set will be forwarded to the second data center, so as to read data across the data centers. The amount of data read across the data centers is very small and will not affect the network bandwidth, etc. Therefore, the operational performance of the disaster recovery system with multiple data centers can be taken into account, on the basis that the reading and writing reliability of the disaster recovery system with multiple data centers is improved. Since the amount of data read across the data centers is small, there will not be much pressure on the data layer of the second data center. The performance requirement of the disaster recovery system with multiple data centers can still be satisfied in the case of high business concurrency.

Especially in the case that the writing user identification set may include user identification(s) corresponding to data writing request(s) within a preset time period from the present moment, the number of data writing request(s) within a preset time period from the present moment may be less, and thus there will be less times needed to read data across data centers. Therefore, the operational performance of the disaster recovery system with multiple data centers can be further taken into account, on the basis that the reading and writing reliability of the disaster recovery system with multiple data centers is improved.

Figure 7:
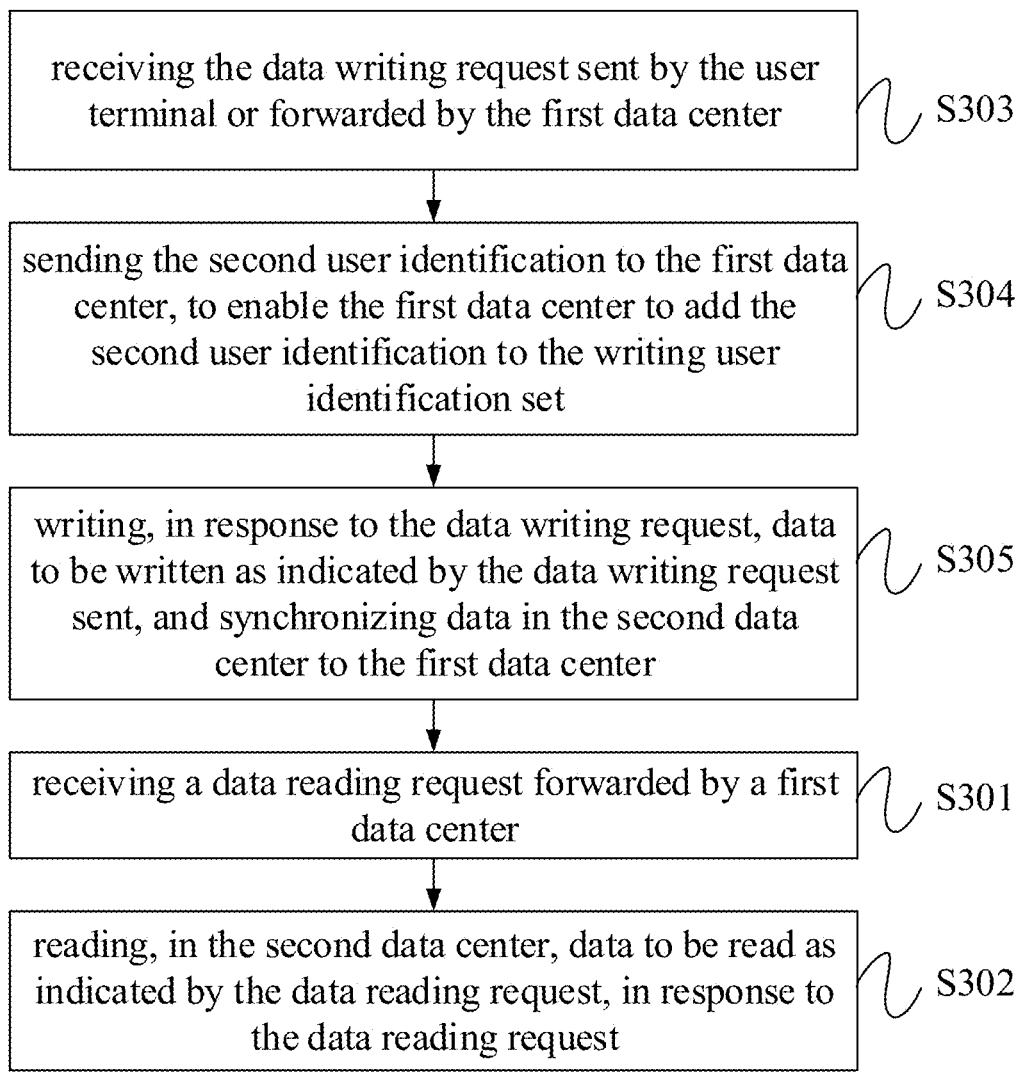
FIG. 7 is a flowchart of another embodiment of the method for data reading and writing processing applicable to the second data center provided by the second aspect of the present application.

FIG. 7 is a flowchart of another embodiment of the method for data reading and writing processing applicable to the second data center provided by the second aspect of the present application. FIG. 7 differs from FIG. 6 in that the method for data reading and writing processing shown in FIG. 7 may further include steps S303-S305.

In step S303, the data writing request sent by the user terminal or forwarded by the first data center is received.

The data writing request received by the second data center may be sent by the user terminal, or may be forwarded by the first data center.

In step S304, second user identification is sent to the first data center, to enable the first data center to add the second user identification to the writing user identification set.

In some examples, the above-mentioned data writing request may include the second user identification. The second data center, after receiving the data writing request, may send the second user identification in the data writing request to the first data center, so that the first data center can add the data writing request to the writing user identification set. Under a condition that the first data center receives a data reading request initiated by a user corresponding to the second user identification, the first data center can forward the data reading request to the second data center for processing.

In step S305, in response to the data writing request, data to be written as indicated by the data writing request is written to the second data center, and the data in the second data center is synchronized to the first data center.

The second data center, after receiving the data writing request, may write data to be written as indicated by the data writing request to the second data center, and synchronize the data in the second data center to the first data center by a data transfer component.

Figure 8:
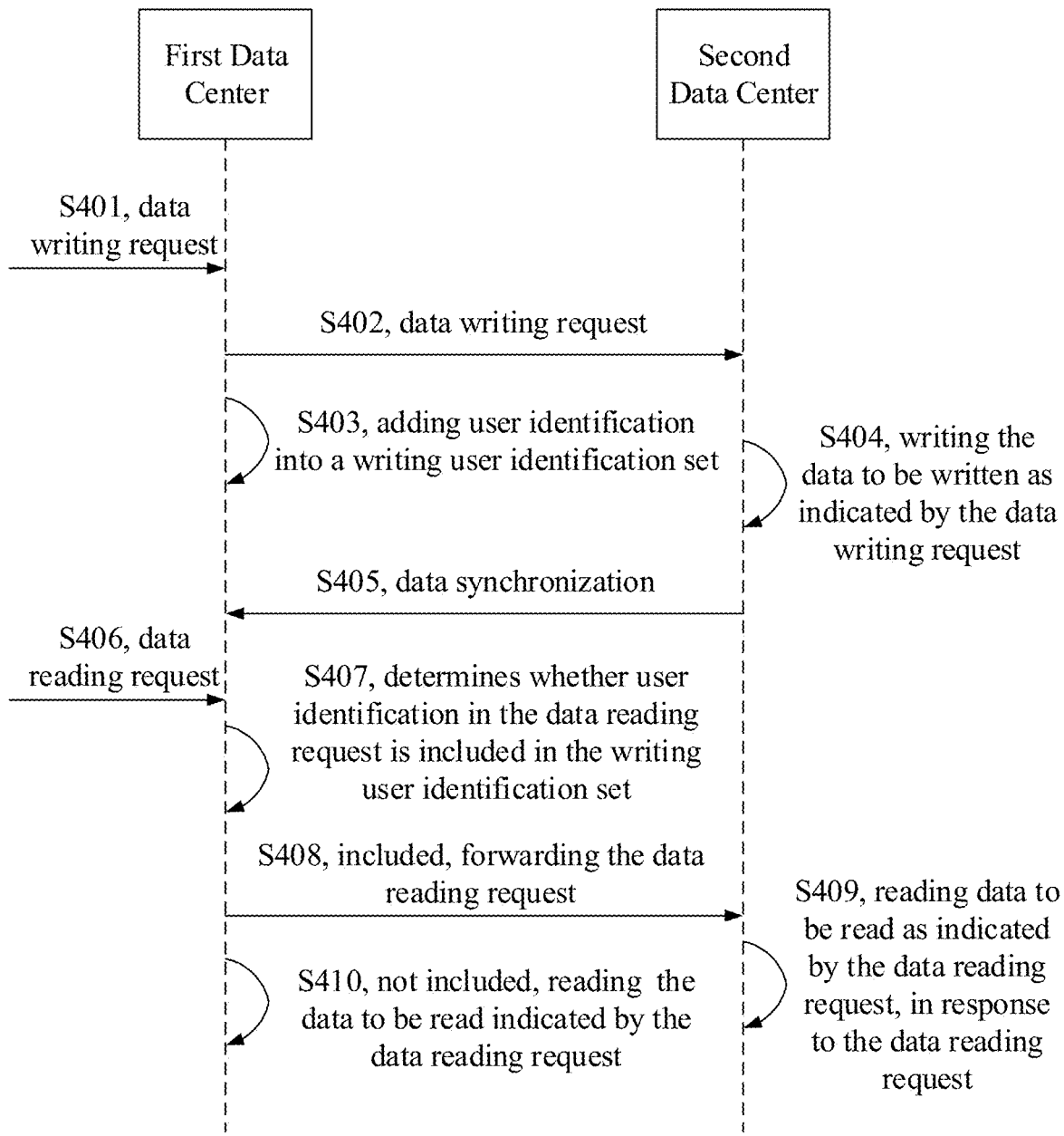
FIG. 8 is a flowchart of an embodiment of a method for data reading and writing processing applicable to a disaster recovery system provided by the present application.

The following is an example to illustrate a method for data reading and writing processing applicable to a disaster recovery system including the above-mentioned first data center and second data center. The method for data reading and writing processing is related to the methods for data reading and writing processing in the first aspect and the second aspect. FIG. 8 is a flowchart of an embodiment of the method for data reading and writing processing applicable to the disaster recovery system provided by the present application. As shown in FIG. 8, the method for data reading and writing processing may include steps S401-S410.

In step S401, the first data center receives a data writing request.

In step S402, the first data center forwards the data writing request to the second data center.

In step S403, the first data center adds user identification in the data writing request into a writing user identification set.

In step S404, the second data center writes the data to be written as indicated by the data writing request, in response to the data writing request.

In step S405, data synchronization is performed between the second data center and the first data center.

In step S406, the first data center receives a data reading request.

In step S407, the first data center determines whether user identification in the data reading request is included in the writing user identification set, in response to the data reading request.

In step S408, under a condition that the user identification in the data reading request is included in the writing user identification set, the data reading request is forwarded to the second data center.

In step S409, the second data center reads data to be read as indicated by the data reading request, in response to the data reading request.

In step S410, under a condition that the user identification in the data reading request is not included in the writing user identification set, the first data center reads the data to be read indicated by the data reading request.

For specific contents of above steps S401-S410, please refer to the related contents in the above-mentioned embodiments, which will not be repeated herein.

In some examples, when the second data center receives the data reading request, it is sufficient to read the data to be read as indicated by the data reading request in the second data center.

It should be noted that other steps of the method for data reading and writing processing applicable to the first data center of the first aspect and the method for data reading and writing processing applicable to the second data center of the second aspect in the above embodiments are also applicable to the disaster recovery system. For these steps, please refer to the relevant descriptions in the above embodiments, which will not be repeated herein.

Figure 9:
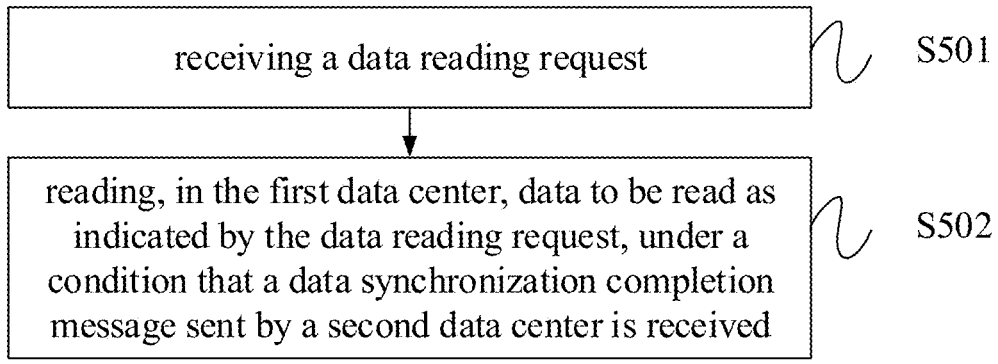
FIG. 9 is a flowchart of an embodiment of a method for data reading and writing processing applicable to the first data center provided by a third aspect of the present application.

Another method for data reading and writing processing applicable to the first data center provided by an embodiment of the present application is illustrated below. The method for data reading and writing processing may be performed by the first data center. FIG. 9 is a flowchart of an embodiment of the method for data reading and writing processing applicable to the first data center provided by a third aspect of the present application. As shown in FIG. 9, the method for data reading and writing processing includes step S501 and step S502.

In step S501, a data reading request is received.

The data reading request may be used to indicate to read data. In the embodiment of the present application, the first data center may receive a data reading request and a data writing request. The first data center may process the data reading request, but forward the data writing request to the second data center for processing, instead of processing the data writing request itself.

In step S502, under a condition that a data synchronization completion message sent by a second data center is received, data to be read as indicated by the data reading request is read in the first data center.

The second data center is configured to receive and process a data writing request sent by a user terminal or forwarded by the first data center. The process of the data writing request by the second data center refers specifically to writing the data to be written as indicated by the data writing request. That is to say, in the disaster recovery system, all data to be written as indicated by data writing request(s) is written to the second data center firstly. Since the number of data writing requests is much smaller than the number of data reading requests, the time taken by the first data center to forward the data writing request to the second data center is negligible. In some examples, the second data center may be considered a master data center and the first data center may be considered a slave data center.

The data synchronization completion message may be used to indicate that data synchronization between the second data center and the first data center is completed. Under a condition that the data synchronization between the second data center and the first data center is completed, the second data center may send the data synchronization completion message to the first data center to notify the first data center that the data synchronization has be completed.

Upon receiving the data synchronization completion message sent by the second data center, which indicates that the data synchronization between the second data center and the first data center has been completed and thus the first data center stores the latest and most complete data, the first data center can respond to the data reading request and read the data to be read as indicated by the data reading request.

In the embodiment of the present application, the second data center is configured to receive and process a data writing request sent by a user terminal or forwarded by the first data center. That is to say, all data to be written as indicated by data writing request(s) is written to the second data center firstly. When the first data center receives the data synchronization completion message sent by the second data center, it is indicated that the data synchronization between the second data center and the first data center has been completed. Therefore, under the condition that the first data center receives the data synchronization completion message sent by the second data center, the first data center reads the data to be read as indicated by the data reading request, which can avoids a situation that data that has been written successfully cannot be read from the data centers, and improve the reading and writing reliability of a disaster recovery system with multiple data centers.

Figure 10:
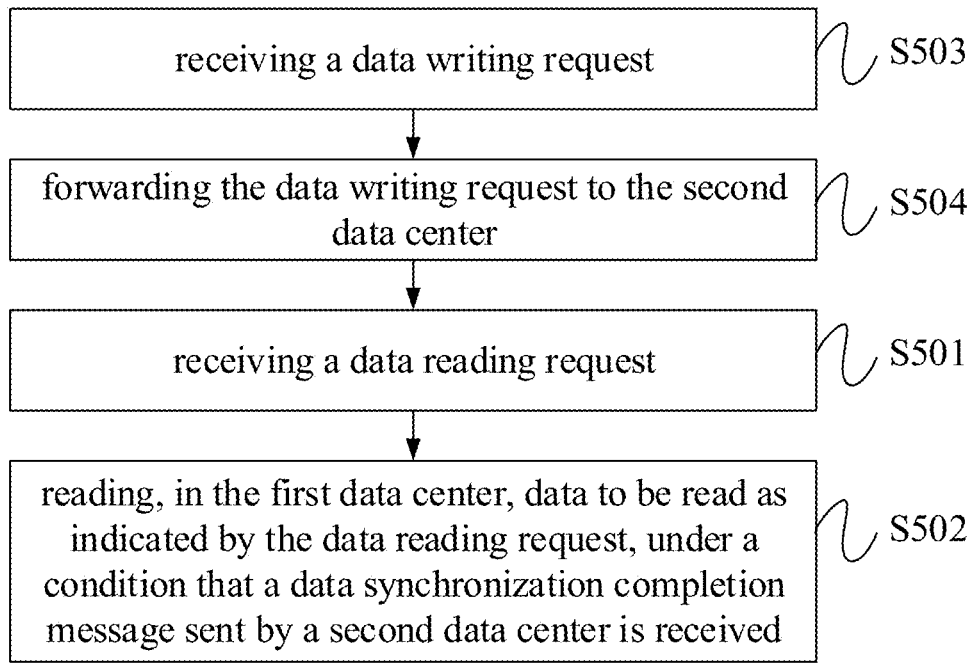
FIG. 10 is a flowchart of another embodiment of the method for data reading and writing processing applicable to the first data center provided by the third aspect of the present application.

FIG. 10 is a flowchart of another embodiment of the method for data reading and writing processing applicable to the first data center provided by the third aspect of the present application. FIG. 10 differs from FIG. 9 in that the method for data reading and writing processing shown in FIG. 10 may further include step S503 and step S504.

In step S503, a data writing request is received.

The data writing request may be used to indicate to write data. Writing data may include adding data and modifying data etc., which is not limited herein.

In step S504, the data writing request is forwarded to the second data center.

The first data center may receive the data writing request, but forward the forward the data writing request to the second data center for processing by the second data center instead of processing the data writing request itself. The second data center may write the data to be written as indicated by the data writing request and synchronize the data to the first data center.

Figure 11:
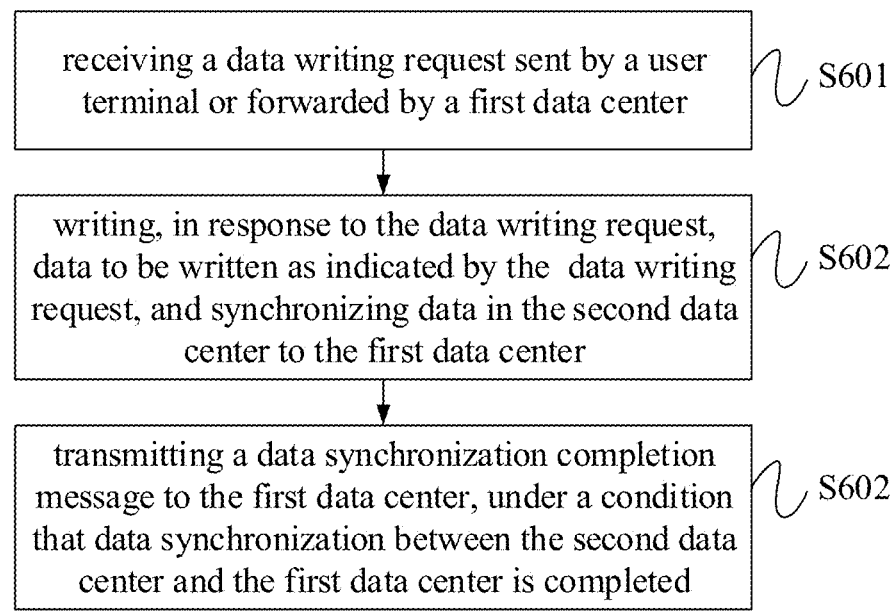
FIG. 11 is a flowchart of an embodiment of a method for data reading and writing processing applicable to the second data center provided by a fourth aspect of the present application.

Another method for data reading and writing processing applicable to the second data center provided by an embodiment of the present application is illustrated below. The method for data reading and writing processing may be performed by the second data center. FIG. 11 is a flowchart of an embodiment of the method for data reading and writing processing applicable to the second data center provided by a fourth aspect of the present application. As shown in FIG. 11, the method for data reading and writing processing includes steps S601-S603.

In step S601, a data writing request sent by a user terminal or forwarded by a first data center is received.

The data writing request received by the second data center may be sent by the user terminal or forwarded by the first data center, and the second data center may process the data writing request. That is to say, in the disaster recovery system, all data to be written as indicated by data writing request(s) is written to the second data center firstly. Since the number of data writing requests is much smaller than the number of data reading requests, the time taken by the first data center to forward the data writing request to the second data center is negligible.

The second data center may receive a data reading request too, and read data to be read as indicated by the data reading request in response to the data reading request.

In step S602, in response to the data writing request, data to be written as indicated by the data writing request is written, and data in the second data center is synchronized to the first data center.

Here, writing may include addition of new data and modification of data etc., which is not limited herein.

In step S603, under a condition that data synchronization between the second data center and the first data center is completed, a data synchronization completion message is transmitted to the first data center.

The second data center may sends the data synchronization completion message to the first data center to notify the first data center that data synchronization has been completed, so that the first data center can respond to the data reading request and the data to be read as indicated by the data reading request can be read in the first data center.

In the embodiment of the present application, the second data center may receive the data writing request sent by the user terminal or forwarded by the first data center, and write the data to be written as indicated by the data writing request. That is to say, all data to be written as indicated by data writing request(s) is written to the second data center firstly. The second data center may synchronize its data to the first data center, and under the condition that the data synchronization is completed, the second data center may notify the first data center that the data synchronization has been completed and data can be read in the first data center by sending the data synchronization completion message, which can avoids a situation that data that has been written successfully cannot be read from the data centers, and improve the reading and writing reliability of a disaster recovery system with multiple data centers.

Figure 12:
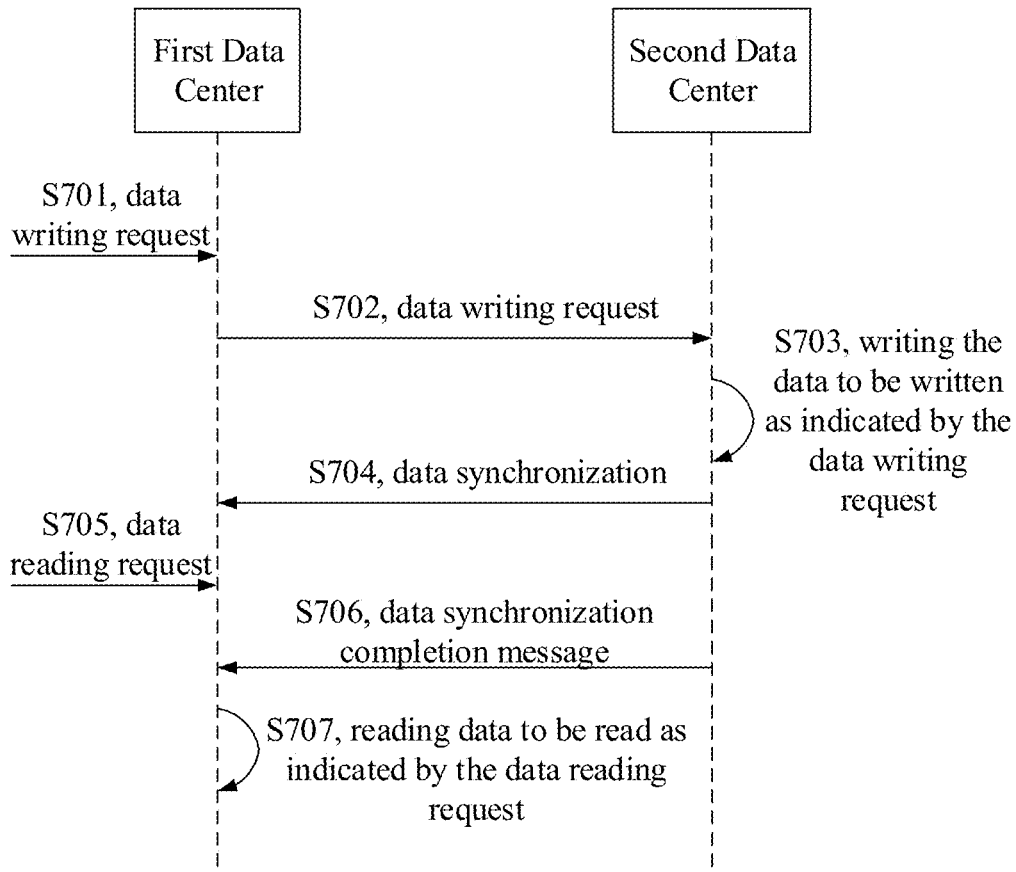
FIG. 12 is a flowchart of another embodiment of the method for data reading and writing processing applicable to the disaster recovery system provided by the present application.

The following is an example to illustrate a method for data reading and writing processing applicable to a disaster recovery system including the above-mentioned first data center and second data center. The method for data reading and writing processing is related to the methods for data reading and writing processing in the third aspect and the fourth aspect. FIG. 12 is a flowchart of another embodiment of the method for data reading and writing processing applicable to the disaster recovery system provided by the present application. As shown in FIG. 12, the method for data reading and writing processing may include steps S701-S707.

In step S701, the first data center receives a data writing request.

In step S702, the first data center sends the data writing request to the second data center.

In step S703, the second data center writes the data to be written as indicated by the data writing request, in response to the data writing request.

In step S704, data synchronization is performed between the second data center and the first data center.

In step S705, the first data center receives a data reading request.

In step S706, the second data center sends a data synchronization completion message to the first data center.

In step S707, under a condition that the first data center receives the data synchronization completion message, the first data center reads data to be read as indicated by the data reading request.

For specific contents of above steps S701-S707, please refer to the related contents in the above-mentioned embodiments, which will not be repeated herein.

In some examples, when the second data center receives the data reading request, it is sufficient to read the data to be read as indicated by the data reading request in the second data center.

It should be noted that other steps of the method for data reading and writing processing applicable to the first data center of the third aspect and the method for data reading and writing processing applicable to the second data center of the fourth aspect in the above embodiments are also applicable to the disaster recovery system. For these steps, please refer to the relevant descriptions in the above embodiments, which will not be repeated herein.

Figure 13:
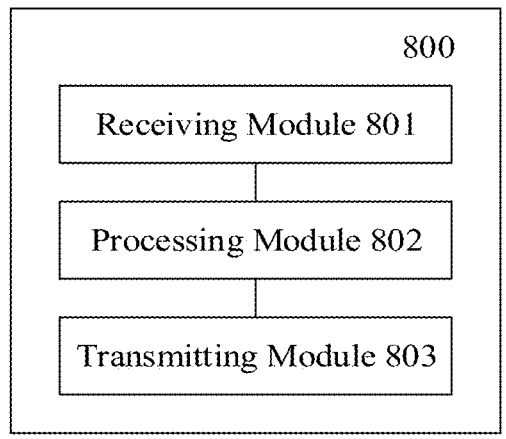
FIG. 13 is a schematic structure diagram of an embodiment of a data center provided by a fifth aspect of the present application.

The present application further provides a data center, that is, the first data center in the first aspect of the foregoing embodiments. FIG. 13 is a schematic structure diagram of an embodiment of the data center provided by a fifth aspect of the present application. As shown in FIG. 13, the data center 800 may include a receiving module 801, a processing module 802 and a transmitting module 803.

The receiving module 801 may be configured to receive a data reading request.

The data reading request may include first user identification.

The processing module 802 may be configured to determine, in response to the data reading request, whether a writing user identification set stored in the first data center includes the first user identification.

The writing user identification set may include user identification(s) corresponding to data writing request(s).

In some examples, the writing user identification set may include user identification(s) corresponding to data writing request(s) within a preset time period from the present moment.

In some examples, the processing module 802 may be further configured to user identification sent by another data center or the second data center, and add the user identification sent by the another data center or the second data center to a writing user identification set in the data center 800.

The transmitting module 803 may be configured to forward, under a condition that the writing user identification set includes the first user identification, the data reading request to a second data center, to read, in the second data center, data to be read as indicated by the data reading request.

The second data center may be configured to receive and process a data writing request sent by a user terminal or forwarded by the first data center.

In the embodiment of the present application, the data center has the writing user identification set stored therein, which includes user identification(s) corresponding to data writing request(s). When the writing user identification set includes the first user identification in the data reading request, it is indicated that the data to be read as indicated by the data reading request may be data that has been written as indicated by a previous data writing request. In that case, the data center forwards the data reading request to the second data center, so that the data can be read in the second data center. The second data center is configured to receive and process a data writing request sent by a user terminal or forwarded by the data center. That is to say, all data to be written as indicated by data writing request(s) is written to the second data center firstly. Therefore, the latest data of a user corresponding to the first user identification can be read in the second data center, which avoids a situation that data that has been written successfully cannot be read from the data centers, and improves the reading and writing reliability of a disaster recovery system with multiple data centers.

Moreover, only the data reading request corresponding to user identification in the writing user identification set will be forwarded to the second data center, so as to read data across the data centers. The amount of data read across the data centers is very small and will not affect the network bandwidth, etc. Therefore, the operational performance of the disaster recovery system with multiple data centers can be taken into account, on the basis that the reading and writing reliability of the disaster recovery system with multiple data centers is improved. Since the amount of data read across the data centers is small, there will not be much pressure on the data layer of the second data center. The performance requirement of the disaster recovery system with multiple data centers can still be satisfied in the case of high business concurrency.

Especially in the case that the writing user identification set may include user identification(s) corresponding to data writing request(s) within a preset time period from the present moment, the number of data writing request(s) within a preset time period from the present moment may be less, and thus there will be less times needed to read data across data centers. Therefore, the operational performance of the disaster recovery system with multiple data centers can be further taken into account, on the basis that the reading and writing reliability of the disaster recovery system with multiple data centers is improved.

Figure 14:
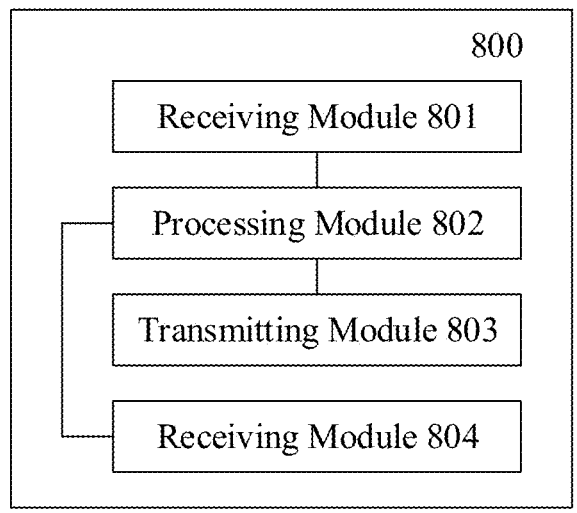
FIG. 14 is a schematic structure diagram of another embodiment of the data center provided by the fifth aspect of the present application.

FIG. 14 is a schematic structure diagram of another embodiment of the data center provided by the fifth aspect of the present application. FIG. 14 differs from FIG. 13 in that the data center 800 may further include a reading module 804.

The reading module 804 may be configured to read the data to be read as indicated by the data reading request, under a condition that the writing user identification set does not include the first user identification In some examples, a valid duration may be set correspondingly for a user identification in the writing user identification set.

The processing module 802 in the above embodiment may be further configured to delete, from the writing user identification set, a user identification whose valid duration has expired.

In some examples, data synchronization may be performed between the data center 800 and the second data center by a data transfer component.

The processing module 802 in the above embodiment may be further configured to obtain predicted delay of the data synchronization performed by the data transfer component, and extend the valid duration of the user identification in the writing user identification set under a condition that the predicted delay of the data synchronization performed by the data transfer component exceeds a delay threshold or a failure is detected in the data transfer component.

The transmitting module 803 in the above embodiment may be further configured to forward the data reading request to the second data center, under the condition that the predicted delay of the data synchronization performed by the data transfer component exceeds the delay threshold or the failure is detected in the data transfer component.

In some examples, the receiving module 801 in the above embodiment may be further configured to receive a data writing request including the second user identification.

The processing module 802 in the above embodiment may be further configured to add the second user identification to the writing user identification set in the data center 800, in response to the data writing request.

Figure 15:
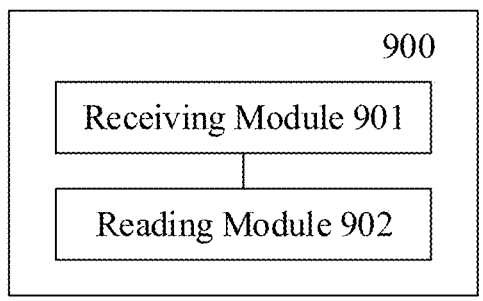
FIG. 15 is a schematic structure diagram of an embodiment of a data center provided by a sixth aspect of the present application.

The present application further provides a data center, that is, the second data center in the second aspect of the foregoing embodiments. FIG. 15 is a schematic structure diagram of an embodiment of the data center provided by a sixth aspect of the present application. As shown in FIG. 15, the data center 900 may include a receiving module 901 and a reading module 902.

The receiving module 901 may be configured to receive a data reading request forwarded by a first data center.

First user identification in the data reading request belongs to a writing user identification set stored in the first data center. The writing user identification set includes user identification(s) corresponding to data writing request(s).

In some examples, the writing user identification set may include user identification(s) corresponding to data writing request(s) within a preset time period from the present moment.

The reading module 902 may be configured to read data to be read as indicated by the data reading request, in response to the data reading request.

The receiving module 901 may further configured to receive and process a data writing request sent by a user terminal or forwarded by the first data center.

In the embodiment of the present application, the data center may receive the data reading request forwarded by the first data center. The first user identification of the data reading request belongs to the writing user identification set. The writing user identification set includes user identification(s) corresponding to data writing request(s). When the first user identification belongs to the writing user identification set, it is indicated that the data to be read as indicated by the data reading request may be data that has been written as indicated by a previous data writing request. In that case, the first data center forwards the data reading request to the data center, so that the data can be read by the data center. The data center is configured to receive and process a data writing request sent by a user terminal or forwarded by the first data center. That is to say, all data to be written as indicated by data writing request(s) is written to the data center firstly. Therefore, the latest data of a user corresponding to the first user identification can be read in the data center, which avoids a situation that data that has been written successfully cannot be read from the data centers, and improves the reading and writing reliability of a disaster recovery system with multiple data centers.

Moreover, only the data reading request corresponding to user identification in the writing user identification set will be forwarded to the data center, so as to read data across the data centers. The amount of data read across the data centers is very small and will not affect the network bandwidth, etc. Therefore, the operational performance of the disaster recovery system with multiple data centers can be taken into account, on the basis that the reading and writing reliability of the disaster recovery system with multiple data centers is improved. Since the amount of data read across the data centers is small, there will not be much pressure on the data layer of the second data center. The performance requirement of the disaster recovery system with multiple data centers can still be satisfied in the case of high business concurrency.

Especially in the case that the writing user identification set may include user identification(s) corresponding to data writing request(s) within a preset time period from the present moment, the number of data writing request(s) within a preset time period from the present moment may be less, and thus there will be less times needed to read data across data centers. Therefore, the operational performance of the disaster recovery system with multiple data centers can be further taken into account, on the basis that the reading and writing reliability of the disaster recovery system with multiple data centers is improved.

Figure 16:
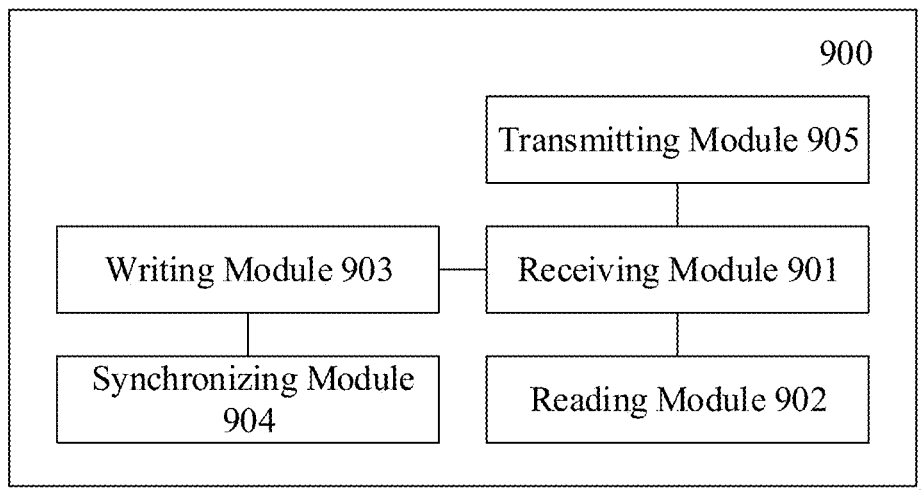
FIG. 16 is a schematic structure diagram of another embodiment of the data center provided by the sixth aspect of the present application.

FIG. 16 is a schematic structure diagram of another embodiment of the data center provided by the sixth aspect of the present application. FIG. 16 differs from FIG. 15 in that the data center 900 may further include a writing module 903, a synchronizing module 904 and a transmitting module 905.

The receiving module 901 in the above embodiment may be further configured to receive a data writing request sent by a user terminal or forwarded by the first data center.

In some examples, the data writing request may include second user identification.

The writing module 903 may be configured to write, data to be written as indicated by the data writing request, in response to the data writing request.

The synchronizing module 904 may be configured to synchronize data in the second data center to the first data center.

The transmitting module 905 may be configured to transmit the second user identification to the first data center, to enable the first data center to add the second user identification to a writing user identification set.

Figure 17:
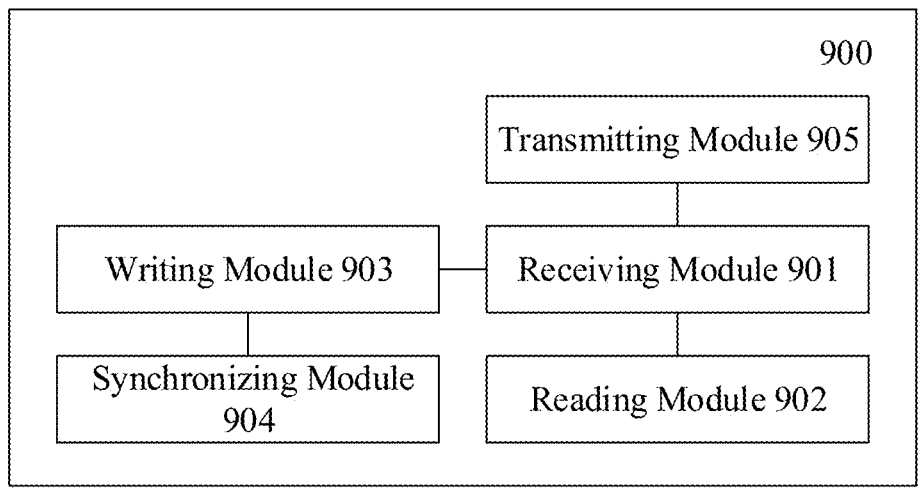
FIG. 17 is a schematic structure diagram of an embodiment of a data center provided by a seventh aspect of the present application.

The present application further provides a data center, that is, the first data center in the third aspect of the foregoing embodiments. FIG. 17 is a schematic structure diagram of an embodiment of a data center provided by a seventh aspect of the present application. As shown in FIG. 17, the data center 1000 may include a receiving module 1001 and a reading module 1002.

The receiving module 1001 may be configured to receive a data reading request.

The reading module 1002 may be configured to read data to be read as indicated by the data reading request, under a condition that a data synchronization completion message sent by a second data center is received.

The second data center may be configured to receive and process a data writing request sent by a user terminal or forwarded by the first data center. The data synchronization completion message may be used to indicate that data synchronization between the second data center and the first data center is completed.

In the embodiment of the present application, the second data center is configured to receive and process the data writing request sent by the user terminal or forwarded by the first data center. That is to say, all data to be written as indicated by data writing request(s) is written to the second data center firstly. When the data center receives the data synchronization completion message sent by the second data center, it is indicated that the data synchronization between the second data center and the data center has been completed. Therefore, the data center reads the data to be read as indicated by the data reading request under the condition that the data center receives the data synchronization completion message sent by the second data center, which can avoid a situation that data that has been written successfully cannot be read from the data centers, and improve the reading and writing reliability of a disaster recovery system with multiple data centers.

Figure 18:
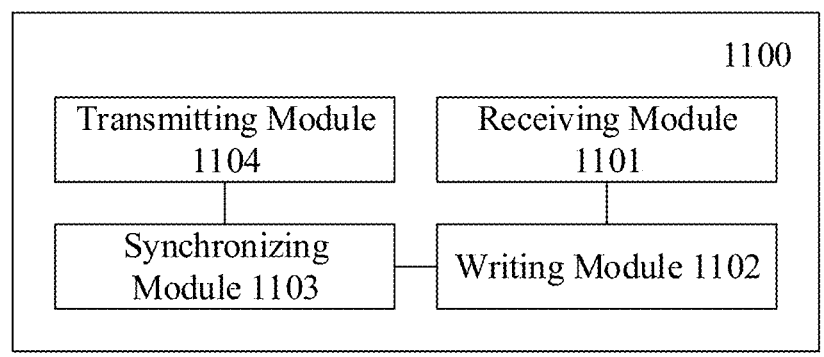
FIG. 18 is a schematic structure diagram of an embodiment of a data center provided by an eighth aspect of the present application.

The present application further provides a data center, that is, the second data center in the fourth aspect of the foregoing embodiments. FIG. 18 is a schematic structure diagram of an embodiment of a data center provided by an eighth aspect of the present application. As shown in FIG. 18, the data center 1100 may include a receiving module 1101, a writing module 1102, a synchronizing module 1103 and a transmitting module 1104.

The receiving module 1101 may be configured to receive a data writing request sent by a user terminal or forwarded by a first data center.

The writing module 1102 may be configured to write, data to be written as indicated by the data writing request, in response to the data writing request.

The synchronizing module 1103 may be configured to synchronize data in the second data center to the first data center.

The transmitting module 1104 may be configured to transmit a data synchronization completion message to the first data center, under a condition that data synchronization between the second data center and the first data center is completed.

In the embodiment of the present application, the data center may receive the data writing request sent by the user terminal or forwarded by the first data center, and write the data to be written as indicated by the data writing request. That is to say, all data to be written as indicated by data writing request(s) is written to the data center firstly. The data center may synchronize its data to the first data center, and under the condition that the data synchronization is completed, the data center may notify the first data center that the data synchronization has been completed and data can be read in the first data center by sending the data synchronization completion message, which can avoids a situation that data that has been written successfully cannot be read from the data centers, and improve the reading and writing reliability of a disaster recovery system with multiple data centers.

The modules in the foregoing embodiments may be implemented specifically as units, apparatus or devices. Specific implementations of the modules are not limited herein.

Figure 19:
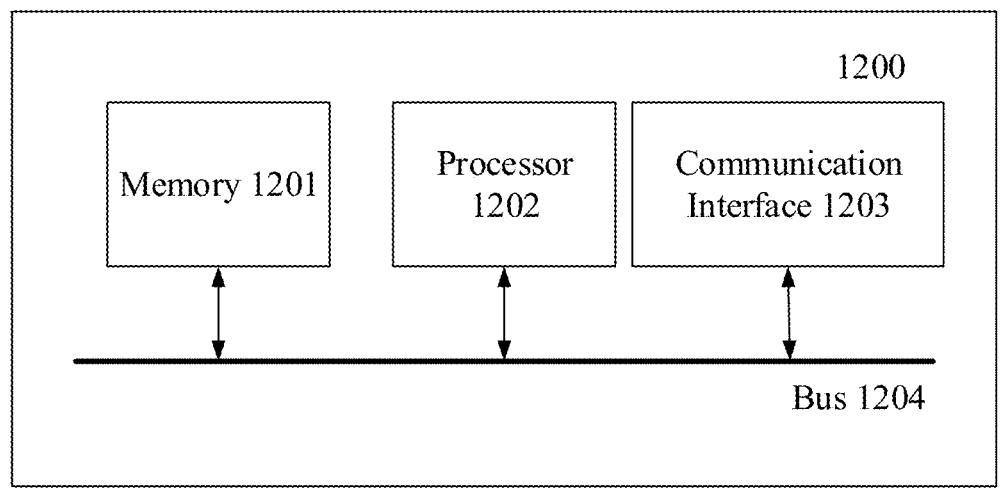
FIG. 19 is a schematic hardware structure diagram of an embodiment of a data center provided by a tenth aspect of the present application.

An embodiment of the present application further provides a data center that may be the first data center or the second data center in any one of the embodiments of the first aspect, the second aspect, the third aspect, and the fourth aspect. FIG. 19 is a schematic hardware structure diagram of an embodiment of the data center provided by a tenth aspect of the present application. As shown in FIG. 19, the data center 1200 may include a memory 1201, a processor 1202, and a computer program stored on the memory 1201 and executable on processor 1202.

In an example, the above processor 1202 may include a central processing unit (CPU), or a specific integrated circuit (an Application Specific Integrated Circuit, ASIC), or may be configured to be one or more integrated circuits to implement the embodiments of the present application.

The memory 1201 may include a mass memory for data or instructions. By way of example and not limitation, the memory 1201 may include a Hard Disk Drive (HDD), floppy disk drive, flash memory, optical disk, magneto-optical disk, magnetic tape, or universal serial bus (Universal Serial Bus, USB) drive, or a combination of two or more of these.

The memory may include a Read-Only Memory (ROM), Random Access Memory (RAM), magnetic disk storage medium device, optical storage medium device, flash memory device, electrical, optical or other physical/tangible memory storage device. Thus, generally, the memory may include one or more tangible (non-transitory) computer-readable storage media (e.g., memory devices) encoded with software including computer-executable instructions, and when executed (e.g., by one or more processors), the software is operable to perform the operations described with reference to the methods for data reading and writing processing according to the present application.

The processor 1202 may execute a computer program corresponding to executable program codes by reading the executable program codes stored in the memory 1201, so as to realize the methods for data reading and writing processing of the embodiments of any one of the above-mentioned first aspect, second aspect, third aspect and fourth aspect.

In an example, the data center 1200 in a distributed system may further include a communication interface 1203 and a bus 1204. Among them, as shown in FIG. 19, the memory 1201, the processor 1202, and the communication interface 1203 may be connected through the bus 1204 to complete mutual communications.

The communication interface 1203 may be configured mainly to implement communications between various modules, apparatus, units and/or devices in the embodiments of the present application. Input devices and/or output devices may be accessed through the communication interface 1203.

The bus 1204 may include hardware, software, or both, and may couple parts of the data center 1200 in the distributed system together. By way of example and not limitation, the bus 1204 may include an Accelerated Graphics Port (AGP) or another graphics bus, an Enhanced Industry Standard Architecture (EISA) bus, a Front Side Bus (FSB), a HyperTransport (HT) interconnection, an Industrial Standard Architecture (ISA) bus, an infinite bandwidth interconnection, a Low pin count (LPC) bus, a memory bus, a MicroChannel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus or other suitable bus, or a combination of two or more of these. Bus 1204 may include one or more buses, where appropriate. Although the embodiment of the present application describes and illustrates particular buses, the present application takes any suitable bus or interconnection into consideration.

An embodiment of the present application further provides a disaster recovery system that may include the data center 800 and the data center 900 in the foregoing embodiments. Alternatively, the disaster recovery system may include the data center 1000 and the data center 1100 in the above embodiments. Alternatively, the disaster recovery system may include the data center 1200 capable of implementing the method for data reading and writing processing of the first aspect and the data center 1200 capable of implementing the method for data reading and writing processing of the second aspect. Alternatively, the disaster recovery system may include the data center 1200 capable of implementing the method for data reading and writing processing of the third aspect and the data center 1200 capable of implementing the method for data reading and writing processing of the fourth aspect.

An embodiments of the present application further provides a computer-readable storage medium having a computer program stored thereon. The computer program, when executed by a processor, can implement the methods for data reading and writing processing of the embodiments of any one of the above-mentioned first aspect, second aspect, third aspect and fourth aspect, and achieve the same technical effects, which will not be repeated herein to avoid redundancy. The computer-readable storage medium may include a Read-Only Memory (ROM for short), a Random Access Memory (RAM for short), a magnetic disk or an optical disk, etc., which is not limited herein.

It should be noted that the various embodiments in the specification are described in a progressive way, the same or similar parts of respective embodiments can be described with reference to each other, and each embodiment focuses on the differences with other embodiments. For the embodiments of data centers and the embodiments of computer-readable storage media, reference may be made to the related parts in the description of the method embodiments. The present application is not limited to the specific steps and structures described above and shown in the figures. Those skilled in the art can make various changes, modifications and additions, or change the order of the steps, after understanding the gist of the present application. Further, for the sake of brevity, a detailed description of known methods and technologies is omitted herein.

Various aspects of the present application are described above with reference to flowcharts and/or block diagrams of methods, apparatus (systems) and computer program products according to embodiments of the present application. It will be understood that each block of the flowcharts and/or block diagrams, and a combination of blocks of the flowcharts and/or block diagrams, can be implemented by computer program instructions. These computer program instructions may be provided to a processor of a general purpose computer, special purpose computer, or other programmable data processing apparatus, to produce a machine, so that the computer program instructions can be executed by the processor of the computer or other programmable data processing apparatus to enable the functions/actions specified in one or more blocks of the flowcharts and/or block diagrams to be implemented. Such processor may be, but are not limited to, a general purpose processor, a special purpose processors, an application specific processor, or a field programmable logic circuit. It will also be understood that each block of the block diagrams and/or flowcharts, and a combination of blocks in the block diagrams and/or flowcharts, may be implemented by special purpose hardware that performs the specified functions or actions, or a combination of the special purpose hardware and computer instructions.

Those skilled in the art would understand that the above embodiments are all illustrative and not restrictive. Different technical features appearing in different embodiments can be combined to achieve beneficial effects. Those skilled in the art would be able to understand and implement other modified embodiments of the disclosed embodiments, on the basis of studying the drawings, the description, and the claims. In the claims, the term "comprising" does not exclude other means or steps, the quantifier "one" does not exclude multiple; the terms "first" and "second" are used to indicate names and not to indicate any particular order. Any reference signs in the claims should not be construed as limiting the protection scope. Functions of several parts appearing in the claims can be realized by a single hardware or software module. The presence of certain technical features in different dependent claims does not mean that these technical features cannot be combined to obtain beneficial effects.

What is claimed is:

1. A method for data reading and writing processing, applicable to a first data center, the method comprising:
    receiving, by a processor of the first data center, a data reading request including a first user identification;
    determining, in response to the data reading request, by the processor of the first data center, whether a writing user identification set stored in the first data center includes the first user identification, the writing user identification set including user identifications corresponding to data writing requests;
    under a condition that the writing user identification set includes the first user identification, forwarding, by the processor of the first data center, the data reading request to a second data center, to read, in the second data center, data to be read as indicated by the data reading request, the second data center being a data center that receives and processes a data writing request sent by a user terminal or forwarded by the first data center, and data corresponding to the data writing request sent by the user terminal or forwarded by the first data center being written into the second data center,
    wherein a valid duration is set correspondingly for a user identification in the writing user identification set;
    deleting, by the processor of the first data center, from the writing user identification set, a user identification whose valid duration has expired,
    wherein data synchronization is performed between the first data center and the second data center by a data transfer component;
    obtaining, by the processor of the first data center, predicted delay of the data synchronization performed by the data transfer component; and
    under a condition that the predicted delay of the data synchronization performed by the data transfer component exceeds a delay threshold or a failure is detected in the data transfer component, extending, by the processor of the first data center, the valid duration of the user identification in the writing user identification set, or forwarding the data reading request to the second data center.

2. The method according to claim 1, further comprising:
    under a condition that the writing user identification set does not include the first user identification, reading, by the processor of the first data center, in the first data center, the data to be read as indicated by the data reading request.

3. The method according to claim 1, further comprising:
    receiving, by the processor of the first data center, a data writing request including the second user identification;
    adding, by the processor of the first data center, in response to the data writing request, the second user identification to the writing user identification set in the first data center; and
    forwarding, by the processor of the first data center, the data writing request to the second data center.

4. The method according to claim 1, further comprising:
    receiving, by the processor of the first data center, another user identification sent by the first data center or the second data center; and adding, by the processor of the first data center, the another user identification sent by the first data center or the second data center to the writing user identification set in the first data center.

5. The method according to claim 1, wherein the writing user identification set includes user identifications corresponding to data writing requests within a preset time period from a present moment.

6. A first data center, comprising:
a processor and a memory storing computer program instructions,
when the processor executes the computer program instructions, a method for data reading and writing processing is performed, the method comprising:
receiving a data reading request including a first user identification;
determining, in response to the data reading request, whether a writing user identification set stored in the first data center includes the first user identification, the writing user identification set including user identifications corresponding to data writing requests;
under a condition that the writing user identification set includes the first user identification, forwarding, the data reading request to a second data center, to read, in the second data center, data to be read as indicated by the data reading request, the second data center being a data center that receives and processes a data writing request sent by a user terminal or forwarded by the first data center, and data corresponding to the data writing request sent by the user terminal or forwarded by the first data center being written into the second data center, wherein a valid duration is set correspondingly for a user identification in the writing user identification set;
deleting, from the writing user identification set, a user identification whose valid duration has expired, wherein data synchronization is performed between the first data center and the second data center by a data transfer component;
obtaining predicted delay of the data synchronization performed by the data transfer component; and
under a condition that the predicted delay of the data synchronization performed by the data transfer component exceeds a delay threshold or a failure is detected in the data transfer component, extending the valid duration of the user identification in the writing user identification set, or forwarding the data reading request to the second data center.

7. The first data center according to claim 6, wherein the method further comprises:
under a condition that the writing user identification set does not include the first user identification, reading, in the first data center, the data to be read as indicated by the data reading request.

8. The first data center according to claim 6, wherein the method further comprises:
receiving a data writing request including the second user identification;
adding, in response to the data writing request, the second user identification to the writing user identification set in the first data center; and
forwarding the data writing request to the second data center.

9. The first data center according to claim 6, wherein the method further comprises:
receiving another user identification sent by the first data center or the second data center; and adding the another user identification sent by the first data center or the second data center to the writing user identification set in the first data center.

10. The first data center according to claim 6, wherein the writing user identification set includes user identifications corresponding to data writing requests within a preset time period from a present moment.

11. A non-transitory storage medium having computer program instructions stored thereon, which when executed by a processor of a first data center, cause a method for data reading and writing processing to be performed, the method comprising:
receiving a data reading request including a first user identification;
determining, in response to the data reading request, whether a writing user identification set stored in the first data center includes the first user identification, the writing user identification set including user identifications corresponding to data writing requests; and
under a condition that the writing user identification set includes the first user identification, forwarding, the data reading request to a second data center, to read, in the second data center, data to be read as indicated by the data reading request, the second data center being a data center that receives and processes a data writing request sent by a user terminal or forwarded by the first data center, and data corresponding to the data writing request sent by the user terminal or forwarded by the first data center being written into the second data center, wherein a valid duration is set correspondingly for a user identification in the writing user identification set;
deleting from the writing user identification set, a user identification whose valid duration has expired, wherein data synchronization is performed between the first data center and the second data center by a data transfer component;
obtaining predicted delay of the data synchronization performed by the data transfer component; and
under a condition that the predicted delay of the data synchronization performed by the data transfer component exceeds a delay threshold or a failure is detected in the data transfer component, extending the valid duration of the user identification in the writing user identification set, or forwarding the data reading request to the second data center.

12. The non-transitory storage medium according to claim 11, wherein the method further comprises:
under a condition that the writing user identification set does not include the first user identification, reading, in the first data center, the data to be read as indicated by the data reading request.

13. The non-transitory storage medium according to claim 11, wherein the method further comprises:
receiving a data writing request including the second user identification;
adding, by the processor of the first data center, in response to the data writing request, the second user identification to the writing user identification set in the first data center; and
forwarding the data writing request to the second data center.

14. The non-transitory storage medium according to claim 11, wherein the method further comprises:
receiving another user identification sent by the first data center or the second data center; and adding the another user identification sent by the first data center or the second data center to the writing user identification set in the first data center.

15. The non-transitory storage medium according to claim 11, wherein the writing user identification set includes user identifications corresponding to data writing requests within a preset time period from a present moment.

\* \* \* \* \*